(No Model.)

R. GROARK.
OSCILLATING PIPE JOINT.

No. 403,883. Patented May 21 1889.

Section a-b.

Section c-d.

Section e-f.

Witnesses
John W. Fisher
Walter E. Ward

Inventor
Richard Groark
By Frederick W. Cameron
His Attorney.

UNITED STATES PATENT OFFICE.

RICHARD GROARK, OF GREENBUSH, NEW YORK, ASSIGNOR OF ONE-FOURTH TO WILLIAM H. HEPINSTALL, OF SAME PLACE.

OSCILLATING PIPE-JOINT.

SPECIFICATION forming part of Letters Patent No. 403,883, dated May 21, 1889.

Application filed January 14, 1889. Serial No. 296,264. (No model.)

*To all whom it may concern:*

Be it known that I, RICHARD GROARK, a citizen of the United States, residing at Greenbush, in the county of Rensselaer and State of New York, have invented a new and useful Oscillating Pipe-Joint, of which the following is a specification.

My invention relates to improvements in devices for joining pipes together, and is especially adapted for use in railway-car steam-heating apparatus; and the objects of my invention are to provide a double oscillating pipe-joint which will allow the pipe to move vertically or laterally without disturbing the connection or permitting the escape of the contents of the pipe, and which will automatically adjust itself to the position of the pipe when the pipe is raised, lowered, or moved to the right or left by the motion of a train of cars, or from any other cause, and to provide a joint in which the gasket is protected from coming into contact with the contents of the pipe, or with any part of the joint which will rub against it, and is thus prevented from being subjected to influences which would cause it to become worn out quickly; also to provide a system of arranging and connecting steam-pipes in a railway-car steam-heating apparatus in such a manner as to provide automatically for the change of position caused by the movement of the train without allowing escape of steam. I attain these objects by the mechanism illustrated in the accompanying drawings, in which—

Figure 1:
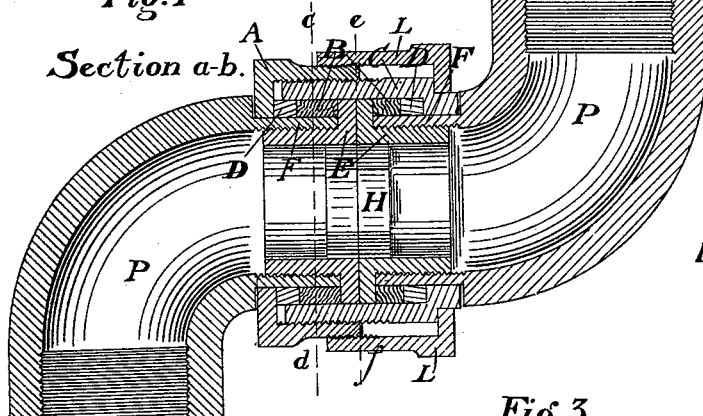
Figure 2:
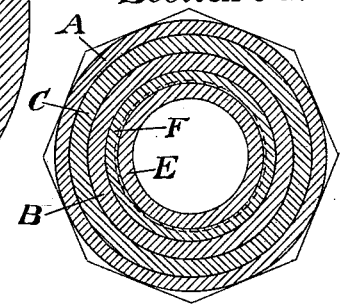
Figure 3:
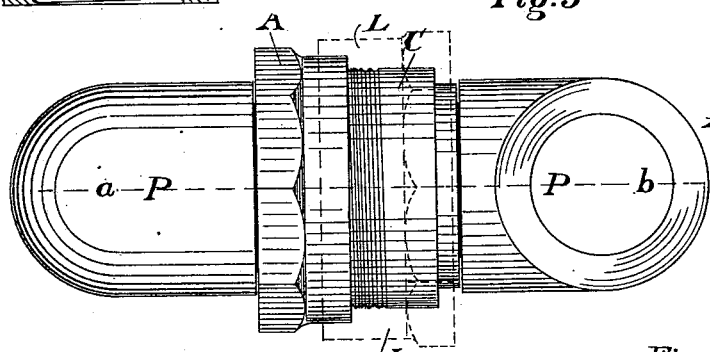
Figure 4:
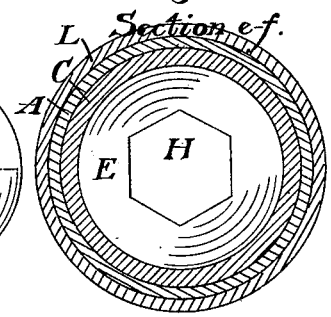
Figure 5:
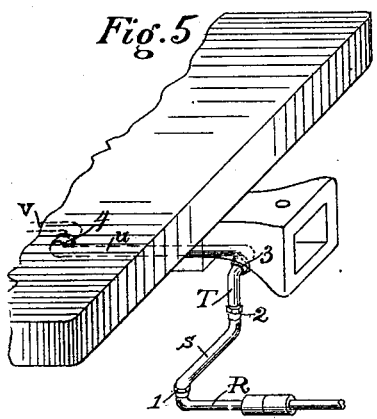
Figure 6:
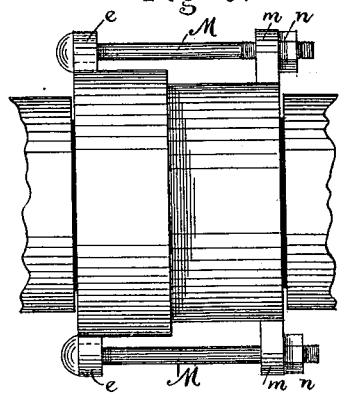

Figure 1 is a section of my pipe-joint, showing the manner in which the different parts are united. Fig. 2 is a section along the line *c d* of Fig. 1. Fig. 3 is an elevation, the dotted lines showing the locking-nut L. Fig. 4 is a section along the line *e f* of Fig. 1; Fig. 5, the system of arranging and connecting steam-pipes in a railway heating apparatus, and Fig. 6 shows the method sometimes used to lock the joint.

Similar letters refer to similar parts throughout the several views.

The elbow P usually has one end provided with a screw-thread on its interior surface, for the purpose of securing it to the adjoining pipe. Near the other end of the elbow P there is formed a shoulder on the exterior by cutting off a part of the metal, leaving a smooth exterior surface, F, extending to the end of the elbow, making the elbow at that end smaller in diameter than the remainder of the elbow. The interior of the elbow under the smooth surface F is threaded. On the smooth surface F on one of the elbows—for two are usually used in making a joint—is placed the nut A, which moves freely on the surface F. Next to the nut A, and nearer the end of the elbow on the smooth surface F, is placed a narrow ring, D, which fits closely and securely to the smooth surface F; also fitting closely and securely to the surface F, next to the ring D, and extending to the end of the elbow, is placed the gasket B, usually composed of rubber.

The thimble E (see Fig. 4) is provided with a threaded portion to mesh with the threads underneath the surface F, and having at one end a portion forming a flange or casing inclosing the end of the gasket B, and providing a smooth surface at the adjoining ends of the elbows, which, when brought together and held closely in contact with each other, makes a tight-fitting joint which will not permit the escape of steam. I stated that on one of the elbows, next to the shoulder formed by making the smooth surface F, the nut A is placed. On the other elbow, and occupying a position similar to that of the nut A, I place the barrel C. Next to the barrel C is placed the ring D. Then the gasket comes next, and the thimble on the end, the same as on the other elbow before herein described. The barrel extends over and in contact with the rings D D, gaskets B B, flanges of the thimbles E E, thus passing over the junction of the elbows, and has an upper threaded surface which meshes with threads cut on the lower surface of the nut A. Thus by screwing the nut A onto the barrel C the parts of the joint will be brought tightly together, the smooth surfaces of the ends of the thimbles forming a tight joint, the joint being also covered by the tight-fitting barrel C. For the purpose of locking the parts together and holding them firmly in close connection, I place the nut L in a recess on the barrel C, formed by the shoulder near the end of the barrel farthest from the nut A. The nut L has threads on its under side to mesh with threads on the upper surface of the nut A. It is apparent that when the nut A is screwed onto the barrel C it will press against the ring D, and the barrel C will press against the corresponding ring D on its side of the point of contact of the elbows, drawing the various parts of the joint closely together and holding them firmly in position. The gasket B being placed between the ring D and the flange of the thimble E, it is protected from coming into contact with the contents of the pipe, and is not rubbed against by the moving parts of the joint, and thus will be preserved for a long time intact.

Each elbow can move easily in the barrel C, connected by the nut A, the thimble E, gasket B, and ring D, moving with the elbow, with which they are in contact, the thimble-flanges moving in contact with each other, the connection remaining perfect, allowing no steam or other contents of the pipe to escape.

The great advantages of my oscillating pipe-joint are especially experienced when it is used in a car steam-heating apparatus, and a part of my invention is the following system of arrangement of the pipes and joints on a car.

In Fig. 5, R, S, T, U, and V are lengths of pipe. The pipes are coupled between the cars in any suitable manner. I prefer to place the coupling on one side of the bumper, as shown in the drawings, because it is more easily operated by hand when it is necessary to do so. At joint 1 pipes R and S are joined by my joint, and it is readily seen that the upper elbow will move backward and forward, allowing for the starting and stopping of the train. At joint 2, I have but one elbow in use, which also allows the backward and forward movement of the pipes to which it is attached to take place without breaking the connection. At joint 3 the lower elbow allows the pipes to move backward and forward, while the upper elbow provides for the up-and-down movement of the pipes occasioned by the motion of the car. The joint at 4 also allows for the up-and-down movement of the pipes, and it is usually placed over the trucks, where the movement is most felt. By this arrangement of the pipes every ordinary motion of a car is provided for, and there is no danger of the pipes becoming broken by the motion of the car, or the joints becoming loose, and thus allowing the escape of steam.

I do not intend to limit myself to the exact position of the pipes and joints as indicated in the drawings, for they could be placed in other combinations and perform the same result.

My pipe-joint is simple in its construction and operation, and performs its functions in a positive and satisfactory manner.

What I claim as new, and desire to secure by Letters Patent, is—

1. In a pipe-joint, the combination of two elbows, each provided near their adjoining ends with an exterior smooth surface, a ring, a gasket, and a thimble secured to each elbow and having a flange in contact with the gasket, one of the elbows having a barrel moving freely on the said smooth surface and extending over the rings, gaskets, and thimbles, having a threaded portion meshing with threads on a nut moving freely on the smooth portion of the other elbow, substantially as described.

2. In a pipe-joint, the combination of two elbows, each provided near their adjoining ends with an exterior smooth surface, a ring, a gasket, and a thimble secured to each elbow, the nut A on one elbow having a threaded surface meshing with threads on the barrel C on the other elbow, with the nut L, secured to the barrel C and provided with a thread meshing with a thread on the nut A, substantially as described.

RICHARD GROARK.

Witnesses:
WILLIAM H. HEPINSTALL,
FREDERICK W. CAMERON.